(12) United States Patent
Berardinelli et al.

(10) Patent No.: US 10,797,923 B2
(45) Date of Patent: Oct. 6, 2020

(54) ENHANCING DATA TRANSFER

(71) Applicant: Nokia Solutions and Networks Oy, Espoo (FI)

(72) Inventors: Gilberto Berardinelli, Aalborg (DK); Frank Frederiksen, Klarup (DK); Klaus Ingemann Pedersen, Aalborg (DK); Kari Pekka Pajukoski, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/573,654

(22) PCT Filed: May 19, 2015

(86) PCT No.: PCT/EP2015/061006
§ 371 (c)(1),
(2) Date: Nov. 13, 2017

(87) PCT Pub. No.: WO2016/184503
PCT Pub. Date: Nov. 24, 2016

(65) Prior Publication Data
US 2018/0131549 A1 May 10, 2018

(51) Int. Cl.
*H04L 27/26* (2006.01)
*G06F 17/14* (2006.01)

(52) U.S. Cl.
CPC ........ *H04L 27/2605* (2013.01); *G06F 17/141* (2013.01); *H04L 27/2602* (2013.01);
(Continued)

(58) Field of Classification Search
CPC ............ H04L 27/2602; H04L 27/2605; H04L 27/2608; H04L 27/2636; H04L 27/263;
(Continued)

(56) References Cited

U.S. PATENT DOCUMENTS 5,886,749 A 3/1999 Williams et al.
2004/0233903 A1* 11/2004 Samaras ............... H04L 1/0065
370/389
(Continued)

FOREIGN PATENT DOCUMENTS

WO 2009021244 2/2009
WO 2014123926 8/2014

OTHER PUBLICATIONS

Sure et al., "On the Comparison of Various Overhead Arrangements for Massive MIMO-OFDM Channel Estimation", 2014, International Journal of Electronics and Telecommunications, vol. 60, No. 2, pp. 173-179. (Year: 2014).*

(Continued)

*Primary Examiner* — Ricky Q Ngo
*Assistant Examiner* — Michael K Phillips
(74) *Attorney, Agent, or Firm* — Harrington & Smith

(57) ABSTRACT

There is provided a method comprising: obtaining, by an apparatus, a first data block, a second data block and a third data block; generating a first signal, wherein a first part of the first signal is generated based on a data of the first data block, and wherein a second part of the first signal is generated based on a data of the second data block, the second part being subsequent in time domain compared with the first part; generating a second signal, wherein a first part of the second signal is generated based on a data of the third data block, and wherein a second part of the second signal is generated based on the data of the second data block, the second part being subsequent in time domain compared with the first part; and transmitting the first and second signals.

14 Claims, 5 Drawing Sheets

(52) U.S. Cl.
CPC ........ *H04L 27/263* (2013.01); *H04L 27/2636* (2013.01); *H04L 27/2608* (2013.01)

(58) Field of Classification Search
CPC ............... H04L 27/2607; H04L 5/0048; H04L 27/2613; H04L 2025/03414; H04L 5/0053; H04L 27/2601; H04L 5/0055; H04L 5/0057; H04L 27/2628; G06F 17/141; H04W 72/0446; H04W 72/0406; H04W 72/0413; H04W 74/004
See application file for complete search history.

(56) References Cited

U.S. PATENT DOCUMENTS

| | | | | |
|---|---|---|---|---|
| 2005/0180315 | A1* | 8/2005 | Chitrapu | H04B 7/2628 370/208 |
| 2006/0135177 | A1* | 6/2006 | Winterbottom | H04W 8/16 455/456.1 |
| 2007/0121939 | A1* | 5/2007 | Olesen | H04W 12/02 380/201 |
| 2007/0280098 | A1* | 12/2007 | Bhatt | H04L 27/2656 370/208 |
| 2008/0267278 | A1* | 10/2008 | Heiman | H04L 1/005 375/235 |
| 2009/0285325 | A1* | 11/2009 | Zhou | H04B 7/0854 375/267 |
| 2010/0278083 | A1* | 11/2010 | Kwak | H04B 7/26 370/280 |
| 2013/0034054 | A1 | 2/2013 | Wu et al. | |
| 2013/0229998 | A1* | 9/2013 | Noh | H04L 5/001 370/329 |
| 2013/0301550 | A1* | 11/2013 | Kim | H04W 72/02 370/329 |
| 2014/0036934 | A1* | 2/2014 | Buckley | H04L 1/007 370/474 |
| 2015/0372843 | A1* | 12/2015 | Bala | H04L 25/03834 375/295 |

OTHER PUBLICATIONS

Berardinelli et al., "On the Potential of OFDM Enhancements as 5G Waveforms", May 18-21, 2014, 2014 IEEE 79th Vehicular Technology Conference (VTC Spring), Seoul, South Korea (Year: 2014).*
Sahin et al, "An Improved Unique Word DFT-Spread OFDM Scheme for 5G System", Dec. 6-10, 2015, IEEE, 2015 IEEE Globecom Workshops, San Diego CA (Year: 2015).*
Nemati et al., "Discrete Fourier Transform Spread Zero Word OFDM", Jun. 5-8, 2017, IEEE, 2017 IEEE International Black Sea Conference on Communications and Networking, Istanbul, Turkey (Year: 2017).*
International Search Report and Written Opinion received for corresponding Patent Cooperation Treaty Application No. PCT/EP2015/061006, dated Feb. 8, 2016, 9 pages.
"Uplink Reference Signals in Support of High-Speed UEs", 3GPP TSG-RAN Working Group 1 meeting #50, R1-074134, Agenda: 6.2.2, Texas Instruments, Oct. 8-12, 2007, pp. 1-6.
Berardinelli et al., "Zero-tail DFT-spread-OFDM signals", IEEE Globecom Workshops, 2013, pp. 229-234.
Michailow et al., "Generalized Frequency Division Multiplexing: Analysis of an Alternative Multi-Carrier Technique for Next Generation Cellular Systems", International Symposium on Wireless Communication Systems, 2012, pp. 171-175.
Schaich et al., "Filterbank Based Multi Carrier Transmission-Evolving OFDM-FBMC in the context of WiMax", European Wireless Conference (EW), Apr. 12-15, 2010, pp. 1051-1058.

* cited by examiner

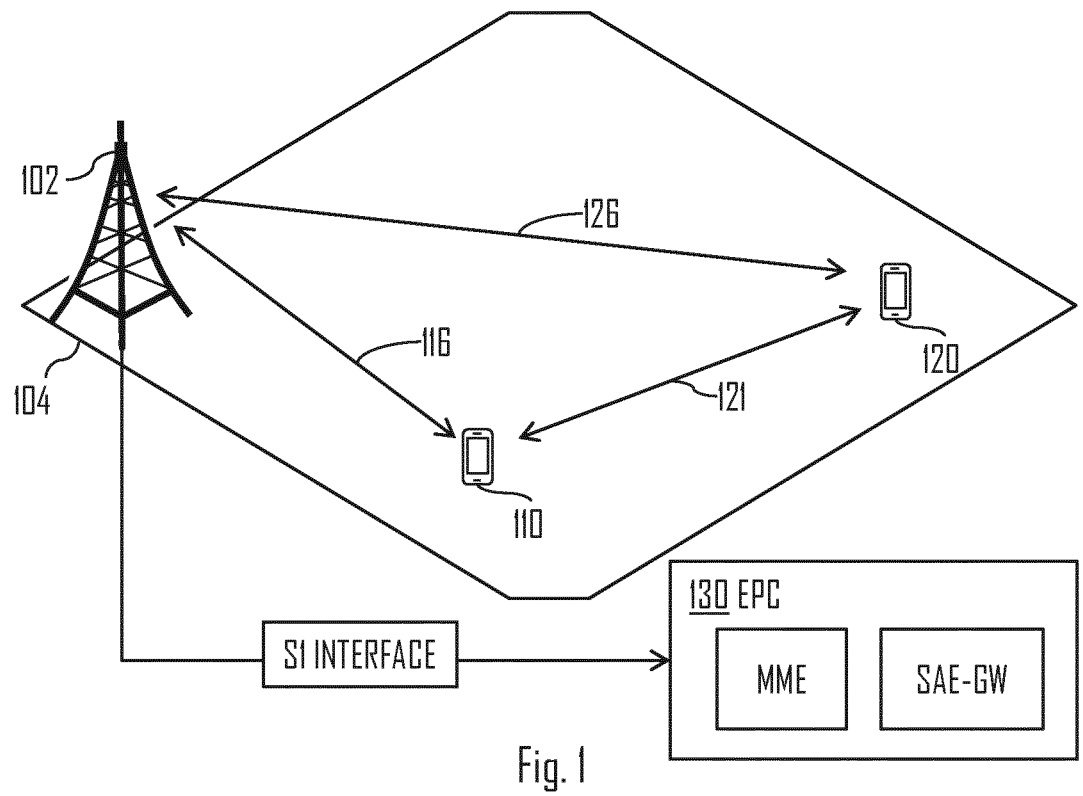

ENHANCING DATA TRANSFER

RELATED APPLICATION

This application was originally filed as PCT Application No. PCT/EP2015/061006 filed May 19, 2015.

TECHNICAL FIELD

The invention relates to communications.

BACKGROUND

The number of terminal devices used for different communication purposes within radio communication networks is increasing. Enhancing the radio communication networks ability to handle increased amount of traffic on a wireless radio channel may increase the overall performance of the system.

BRIEF DESCRIPTION

According to an aspect, there is provided the subject matter of the independent claims. Some embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following embodiments will be described in greater detail with reference to the attached drawings, in which FIG. 1 illustrates an example radio system to which embodiments of the invention may be applied;

FIG. 2 illustrates a block diagram according to an embodiment of the invention;

DETAILED DESCRIPTION OF SOME EMBODIMENTS

Figure 3A:
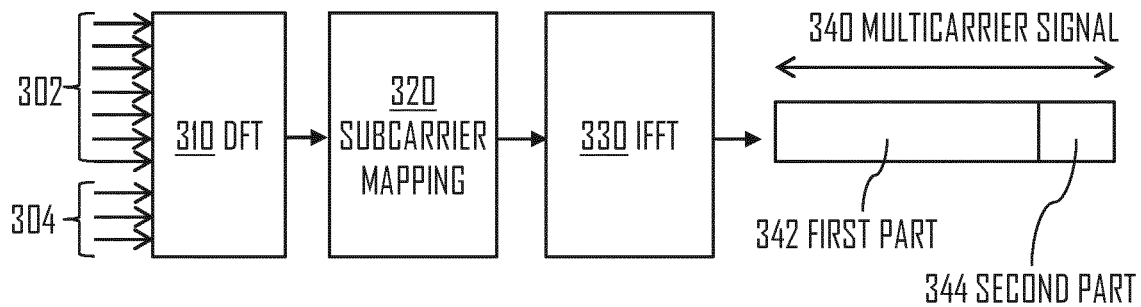
FIGS. 3A to 3C illustrate some embodiments.

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio system, such as in at least one of the following: Worldwide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced, and/or 5G system. The present embodiments are not, however, limited to these systems.

The embodiments are not, however, restricted to the system given as an example but a person skilled in the art may apply the solution to other communication systems provided with necessary properties. One example of a suitable communications system is the 5G concept, as listed above. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates. 5G will likely be comprised of more than one radio access technology (RAT), each optimized for certain use cases and/or spectrum.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

FIG. 1 illustrates an example of a radio system to which embodiments of the invention may be applied. Referring to FIG. 1, radio communication networks, such as the Long Term Evolution (LTE), the LTE-Advanced (LTE-A) of the $3^{rd}$ Generation Partnership Project (3GPP), or the predicted future 5G solutions, are typically composed of at least one network element, such as a network element 102, providing a cell 104. Each cell may be, e.g., a macro cell, a micro cell, femto, or a pico-cell, for example. The network element 102 may be an evolved Node B (eNB) as in the LTE and LTE-A, a radio network controller (RNC) as in the UMTS, a base station controller (BSC) as in the GSM/GERAN, or any other apparatus capable of controlling radio communication and managing radio resources within a cell. For 5G solutions, the implementation may be similar to LTE-A, as described above. The network element 102 may be a base station or a small base station, for example. In the case of multiple eNBs, or similar, in the communication network, the eNBs may be connected to each other with an X2 interface as specified in the LTE. Other communication methods between the network elements may also be possible.

The network element 102 may be further connected via an S1 interface to an evolved packet core (EPC) 130, more specifically to a mobility management entity (MME) and to a system architecture evolution gateway (SAE-GW).

The cell 104 may provide service for at least one terminal device 110, 120, wherein the at least one terminal device 110, 120 may be located within and/or comprised in the cell 104. The at least one terminal device 110, 120 may communicate with the network element 102 using a communication link(s) 116, 126, which may be understood as communication link(s) for end-to-end communication, wherein source device transmits data to the destination device via the network element 102 and/or core network. The communication link(s) 116, 126 may be controlled by the network element 102. This may mean that resource allocation, such as Physical Resource Block (PRB) allocation, may be decided by the network element 102. Resource allocation may be based on data from the network element 102 and/or the data from the at least one terminal device 110, 120. For example, Channel Quality Indicators (CQI) may be received from the at least one terminal device 110, 120.

The at least one terminal device 110, 120 may reside within some distance from the network element 102, and thus different terminal devices 110, 120 may be within different distances from the network element 102.

Further, it is possible that there are other cells in the area of the cell 104. The other cells may be at least partially in the area of the cell 104. The other cells may be provided, for example, by other network elements providing macro, micro, pico and/or femto cells. The at least one terminal device 110, 120 may be simultaneously within multiple cells provided by the other network elements. The serving network element may be selected by various criteria, such as received power, signal to noise ratio (SNR) and path loss, to name a few.

The at least one terminal device 110, 120 may be a terminal device of a radio system, e.g. a computer (PC), a laptop, a palm computer, a mobile phone, a smart phone, a tablet, a phablet or any other user terminal or user equipment capable of communicating with the radio communication network. The at least one terminal device 110 may be stationary or on the move.

The network element 102, the at least one terminal device 110, 120 and/or the other network elements may support Dual Connectivity (DC) or similar, and/or Multiple Input Multiple Output (MIMO) connectivity. Thus, for example, data may be transmitted by multiple network elements and/or data may be transmitted by a single network element using multiple antennas for the transmission, wherein the transmission may be substantially simultaneous. Naturally, the receiver may comprise, for example, multiple antennas and/or communication circuitries that are able to detect and/or receive the transmissions from multiple sources.

In an embodiment, the at least one terminal device 110, 120 is able to communicate with other similar devices via the network element 102. The other devices may be within the cell 104 and/or may be within other cells provided by other network elements.

In an embodiment, the at least one terminal device 110, 120 may communicate directly with other terminal devices using, for example, Device-to-Device (D2D) communication. For example, in FIG. 1, a first terminal device 110 may communicate (e.g. transfer information) with a second terminal device 120 using a D2D communication link 121 between the devices, and vice versa. This may enhance the performance of the radio communication network.

As there is at least some distance between terminal devices 110, 120 and the network element 102, providing the cell 104, communication links 116, 126, 121 may suffer from time dispersion of wireless signals used to transmit and receive information. Further, as the distances may vary between devices, time dispersion may become an increasing concern.

Time dispersion characteristics of a wireless channel(s), comprised in the communication links 116, 126, 121, may introduce inter-symbol interference (ISI) in the received signal, which may reduce change for correct detection of the transferred information by the receiver. For example, if the network element 102 transmits data to the first terminal device 110, the terminal device 110 may receive the same transmitted sub-carrier signal from multiple paths. The signal may be, for example, travel directly to the first terminal device 110 and/or it may bounce one or more times from objects and/or different layers of atmosphere.

The effects of the ISI may be countered using a guard period between adjacent time symbols. Nonetheless, such guard period may introduce and/or increase a radio communication system overhead which may increase linearly with the delay spread of the channel. For example, in Orthogonal Frequency Division Multiplexing (OFDM) systems, the guard period may be replaced by a Cyclic Prefix (CP) that may be obtained as a copy of a last part of the time symbol, and appended at the beginning of the time symbol itself. The CP may allow converting the linear convolution with the channel to a circular convolution, thus enabling low complexity one-tap frequency domain equalization. The CP is typically hardcoded in the system numerology and its duration is defined as a compromise between the necessity of coping with radio channels experiencing different propagation characteristics, and maintaining a reasonable overhead. The reason for the hard-coding may be to ensure the same performance over the entire cell coverage area (e.g. coverage area of cell 104) while maintaining orthogonality between scheduled users (e.g. at least one terminal device 110, 120). From a system perspective, the CP represents pure (e.g. undesired) overhead, and is discarded at the receiver.

In high-Doppler environments, an LTE uplink (UL) performance may suffer from performance degradation. The reason for such degradation may be that a rate of reference symbol (RS) transmission struggles to cope with fast changes of the wireless radio channel. For example, in high Doppler environments, the radio channel at one end of the slot may have little correlation with the channel at another end of the slot, and thus, applying a single channel estimate for data demodulation may become increasingly problematic as the terminal device speed grows.

Zero Tail Discrete Fourier Transform-spread OFDM (ZT DTF-s-OFDM) signal(s) convert the CP to a low power tail which may be a part of the Inverse Fast Fourier Transform (IFFT) output, and may also meant to cope with the delay spread of the wireless radio channel. The main advantage of the ZT DFT-s-OFDM signal, with respect to traditional CP-OFDM, may be the possibility of dynamically adjusting tail duration of the signal depending on the estimated characteristics of the multipath wireless radio channel. However, even though adaptive, the low power tail may still provide overhead in the radio communication system perspective.

Emerging waveforms, such as Generalized Frequency Division Multiplexing (GFDM) or Filter Bank Multicarrier (FBMC) may have the promise of eliminating the CP overhead due to well-designed shaping filter applied at each subcarrier of the signal, which may reduce the impact of the ISI. Nonetheless, such waveforms may still require some time domain overhead for accommodating the tails of the filter or complex iterative process at the receiver to restore the orthogonality of the frequency resources.

Regarding the performance degradation for high speed mobiles, there may be few options, such as adding an additional reference block (e.g. Reference Symbol (RS)).

This may however create a RS overhead. By introducing an additional RS DFT-s-OFDMA symbol, the terminal device throughput may drop by about 20%, since there would be, for example, only 5 instead of 6 data DFT-s-OFDMA symbols.

Second option may be to divide some DFT-s-OFDMA symbols to portions and to piggy-back RS signal with the data transmission in a portion of DFT-s-OFDMA symbol. The problem with this option may be the increased overall CP overhead since the number of CPs may increase.

There is provided a solution to enhance the performance of the radio communication system by converting, at least partly, the system overhead into useful information, while preserving, at least partly, robustness of the wireless radio channel to the delay spread. A new signal form may be introduced as a part of the solution.

FIG. 2 illustrates a block diagram according to an embodiment of the invention. Referring to FIG. 2, in step 202, an apparatus, such as the at least one terminal device 110, 120, the network element 102, a communication circuitry comprised in the at least one terminal device 110, 120, and/or a communication circuitry comprised in the network element 102, may obtain a first data block, a second data block and a third data block. The data blocks may comprise information that is to be delivered from a transmitting device to a receiving device.

In step 204, the apparatus may generate a first signal, wherein a first part of the first signal is generated based on a data of the first data block, and wherein a second part of the first signal is generated based on a data of the second data block, the second part of the first signal being subsequent in time domain compared with the first part of the first signal.

Similarly, in step 206, the apparatus may generate a second signal, wherein a first part of the second signal is generated based on a data of the third data block, and wherein a second part of the second signal is generated based on the data of the second data block, the second part of the second signal being subsequent in time domain compared with the first part of the second signal.

The generation of the first and second signals based on the data of the first, second and third data blocks may mean that the data of the data blocks is comprised in the first and second signals as described above. For example, if the first data block comprises binary number 0100110, the generated first part of the first signal may comprise said binary number. This may mean that when the first signal is received, the receiver may modulate the received signal to back into the binary form comprising said binary number.

Further, as the second parts of the first and second signals may be generated based on the data of the second data block, the second parts of the first and second signals may comprise at least partially the same data. In an embodiment, the second parts of the first and second signal are generated based on the same data. In an embodiment, the second parts of the first and second signals are substantially identical. Thus, the second parts of the first and second signals may be generated from the data of the second data block. In other words, the second parts of the first and second signals may be generated using the data of the second data block as an input.

In step 208, the apparatus may transmit or cause transmission of the first and second signals. The transmitting, by the apparatus, may comprise transmitting the first signal and/or the second signal to a receiving apparatus, which may be similar as the transmitting apparatus. For example, the at least one terminal device 110, 120 may transmit the first signal and the second signal to the network element 102, and/or vice versa. It may also be possible that the transmitting comprises broadcasting the first and/or second signals. For example, the network element 102 may broadcast the first and second signals to a plurality of terminal devices. In another example, the at least one terminal device 110, 120 may broadcast the first and second signals to the plurality of terminal devices.

In an embodiment, the first signal is a first multicarrier signal. In another embodiment, the first signal is a first single-carrier signal.

In an embodiment, the second signal is a second multicarrier signal. In another embodiment, the second signal is a second single-carrier signal. In the following, some embodiments are described in the context of the multicarrier signals but the embodiments are applicable to the single-carrier signals as well.

In an embodiment, the apparatus broadcasts at least one of the second portion of the first multicarrier signal, the second portion of the second multicarrier signal. In such case, it may be possible that the apparatus either transmits or broadcasts the first portions of the signals. Further, it is possible that one of the first portion of the first multicarrier signal and the first portion of the second multicarrier signal may be broadcasted, whereas the other first portion may be transmitted using end-to-end type communication (i.e. unicast). For example, the first and third parts may have different receivers. Similarly, the first and third parts may be transmitted to one receiver. In such case, the second parts may be transmitted to the same receiver (to which the first and/or third parts are transmitted to) or to different receiver(s).

The second parts of the first and second multicarrier signals may be conventionally considered to be radio communication system overhead. The present solution enables to use the second parts to carry useful information while still maintaining the robustness to the delay spread. For example, the first parts of the signals may be varying between the signals. Thus, the first multicarrier signal may carry different data compared with the second multicarrier signal. However, the second parts of the signals may be fixed between the signals as they may be generated based on the same data. The second parts of the signals may be located in place of the guard periods, and may be repeated for a set of consecutive signals. For example, the apparatus may generate 14 signals each representing one fixed-tail (FT) DFT-s-OFDM symbol, wherein the second parts of said 14 signals may be fixed and/or generated based on the same data, such as the data of the second data block. Thus, the same fixed part and/or fixed-tail may be repeated for, for example, duration of a sub-frame (i.e. LTE subframe).

Let us assume, for example, that the wireless radio channel is slowly varying over a set of consecutive symbols (i.e. FT DFT-s-OFDM symbols). As explained above, a symbol may be represented by a multicarrier signal, such as the first and/or the second multicarrier signals. In a way, it may be understood that the information comprised in the symbol may be carried by the signal. In case the length of a second part of the symbol (e.g. the second part of the multicarrier signal) is sufficient to cope with an excess delay spread of the wireless radio channel, the cyclicity of the signal may be preserved at the receiver and traditional low complexity one-tap frequency domain equalization may be performed. This may be because each symbol may experience from the previous symbol the similar delay spread component, or ISI, that itself is creating to the next symbol. This may allow restoring a similar situation compared with the traditional CP-based transmission (i.e. the copy of the last portion of the symbol appended at its beginning).

Therefore, the receiver of the first and second multicarrier signals may use the repeated second parts of the signals similar to a situation of using the CP. However, as the second parts of the first and second multicarrier signals are transmitted by the transmitter, the receiver may also use the received second parts of said signals instead of omitting them, and thus useful information may be transferred and the delay spread may still be handled by the receiver. Further, the second parts may be comprised in the tails of the multicarrier signals. For example, a last part of a multicarrier signal, such as a tail of the first multicarrier signal, may extend, in time domain, over the second multicarrier signal. However, using the above method the interference caused by the tail may be reduced and/or removed, and as said, useful information may be transmitted.

There is also provided a signal comprising: a first multicarrier signal, wherein a first part of the first multicarrier signal is generated from a data of a first data block, wherein a second part of the first multicarrier signal is generated from a data of a second data block, and wherein the second part of the first multicarrier signal is subsequent in time domain compared with the first part of the first multicarrier signal, and a second multicarrier signal, wherein a first part of the second multicarrier signal is generated from a data of a third data block, wherein a second part of the second multicarrier signal is generated from the data of the second data block, and wherein the second part of the second multicarrier signal is subsequent in time domain compared with the first part of the second multicarrier signal. Said signal may be transmitted by the apparatus and received by another. For example, the first terminal device 110 may transmit the signal to the network element 102, and/or vice versa.

Figure 3B:
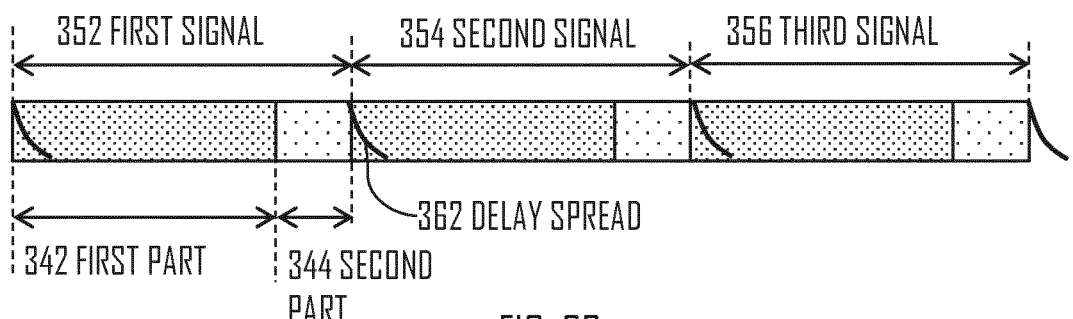
Figure 3C:
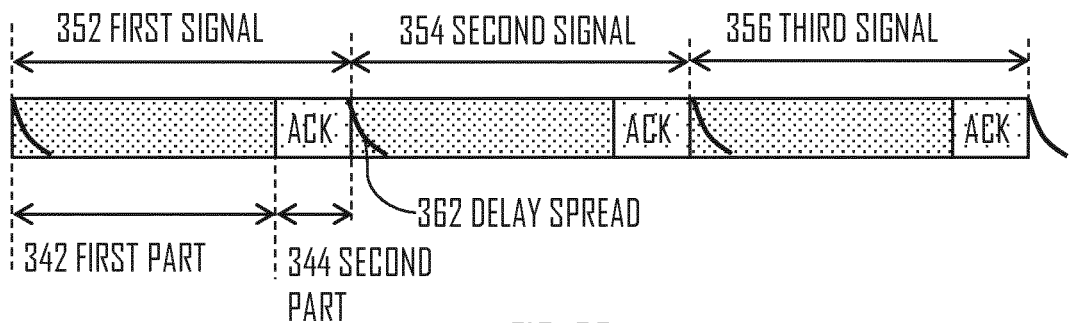

Let us now look closer on embodiments of the invention. FIGS. 3A to 3C illustrate some embodiments. Referring to FIG. 3A, an example of generating a multicarrier signal 340 according to an embodiment may be shown. As described earlier, the multicarrier signal 340, such as the first and/or second multicarrier signals, may comprise a first part and a second part. In FIG. 3A, the first part may be a first part 342, and the second part may be a second part 344. The second part 344 may be a fixed part as it may be fixed between two or more signals each representing a time domain symbol. Similarly, the first part may a variable part as it may change between time domain symbols or signals. Thus, the second part 344 may be referred also a fixed part and the first part may be referred to as a variable part.

In an embodiment, the second part 344 is a fixed part. The first part 342 may be a variable part. The second part 344 may be, for example, constant in time (i.e. reference signals), it may be varying in time, but constant for a number of consecutive FT DFT-s-OFDM symbols (i.e. reference symbols or low rate signaling, such as ACK/NACK, or Channel Quality Indicator (CQI) information).

The second part 344 of the multicarrier signal 340 may be a tail of the multicarrier signal 340, for example. This may mean that the second part 344 extends, in time domain, from the end of the multicarrier signal 340 towards the beginning of said signal. For example, if we consider multiple subcarriers that are comprised in the multicarrier signal 340, the tail of the multicarrier signal 340 may comprise tail of at least one subcarrier signal.

In an embodiment, the second parts of the first and second multicarrier signals, described above, are tails of said signals, and wherein said signals are fixed-tail multicarrier signals. Example of this is given in relation to multicarrier signal 340. This may mean that at the receiver, for example, the second part 344, transmitted by the transmitter, may be detected and/or received as the tail of the multicarrier signal 340. As described, the tail may extend at least partially over the next time symbol.

If we look closer on how the signals are formed in the example of FIG. 3A, a number of data inputs 302, 304 may be used. FIG. 3A may be understood to shown how each multicarrier signal is generated. In other words, the modulation and transformation of the data to a signal may be performed signal by signal. The generation may comprise using Discrete Fourier Transform (DFT) 310, subcarrier mapping 320 and/or Inverse Fast Fourier Transform (IFFT) 330. Each step may be performed by a dedicated circuitry, for example. For example, the apparatus described in relation to FIG. 2, may comprise a DFT circuitry, a subcarrier mapping circuitry, and IFFT circuitry. It may also be possible that the apparatus comprises a communication circuitry capable and/or configured at least to perform the steps 310, 320, 330 shown in FIG. 3A.

As shown, the data inputs 302, 304 may be used as inputs to the signal generation. Outputs of the DFT 310 may be modulated and/or channel coded. After modulation, in subcarrier mapping, the modulated and/or channel coded outputs may be mapped to subcarriers. After the subcarrier mapping, the multicarrier signal 340 may be generated by transforming the frequency domain representation to time domain using the IFFT 330.

The first part 342 of the multicarrier signal 340 may be generated from a data of a first data block 302, whereas the second part 344 may be generated from a data of the second block 304. This is similar as described in relation to FIG. 2.

In an embodiment, the second data block 304 comprises samples each having power that differs substantially from zero. That is, the data of the second data block 304 may comprise values that are not representing zero power. In other words, the samples in the second data block 304 may comprise information. In an embodiment, the second data block 304 comprises at least one sample that is substantially zero and/or very low power.

In an embodiment, the tails of the first and second multicarrier signal are generated from the data of the second data block, described in relation to FIG. 2, and wherein the tails of the first and second multicarrier signal comprise the same data. For example, in FIG. 3A, the second part 344 may be generated from the second data block 304. Similarly, if further signals are generated, the tails of the signals may comprise the same data, whereas the first parts (i.e. first part 342) may be varying between signals.

In an embodiment, the multicarrier signal 340 and/or the first and second signals, described in relation to FIG. 2, are FT DTF-s-OFDM signals.

Referring to FIG. 3B, a sequence of consecutive multicarrier signals 352, 354, 356 may be shown. In this example, three consecutive signals may be shown, but as described, the number of generated signals may be more or less, for example, 2, 7, 14 signals, but not limited to these numbers.

As in FIG. 3A, a first, second and/or third multicarrier signals 352, 354, 356 may each comprise the first part 342 and the second part 344. A delay spread 362 of the signals may be shown in FIG. 3B. Each signal may cause interference to at least adjacent signals. However, as the invention proposes, these delay spreads 362 may be handled by repeating the second part 344 between the signals, and further this enables carrying information in the second part 344.

In an embodiment, the first part 342 of the first multicarrier signal 352 is longer in time domain compared with the second part 344 of the first multicarrier signal 352. Similarly, the first parts of the second and third multicarrier signals 354, 356 may be longer compared with the second parts. However, the duration of the first part and/or the second part may vary between the multicarrier signals 352, 354, 356. For example, the second part of the second multicarrier signal 354 may be longer compared with the second part of the first multicarrier signal 352.

In an embodiment, the apparatus is capable of changing the duration or length of the second part 344. The duration may be changed for each signal such that the duration of the second part 344 may vary between consecutive signals. Naturally it is possible that duration of each signal comprising the same second part may be changed. Thus, for example, two consecutive signals comprising the same second part may be generated so that the duration of the second parts is the same between said two consecutive signals.

In an embodiment, the first and second multicarrier signals 352, 354 are transmitted consecutively in time domain. Naturally, the third multicarrier signal 356 may be transmitted after the second multicarrier signal, if there are more than two multicarrier signals to be transmitted. Further, the apparatus may transmit a plurality of multicarrier signals consecutively, wherein each signal of the plurality of multicarrier signals comprises the same second part. In an embodiment, the plurality of multicarrier signals are transmitted substantially simultaneously.

Referring to FIG. 3C, the second parts of the first, second and/or third multicarrier signals may be used to transmit control message(s). For example, the apparatus may transmit a control message to another apparatus using the second parts. In an embodiment, the second data block 304 of FIG. 3A comprises the control message. Thus, one or more multicarrier signals 352, 354, 356 may be used to carry the control message to the receiving apparatus.

In the example of FIG. 3C, the second part of each multicarrier signal 352, 354, 356 may comprise an Acknowledgement (ACK) message. Similarly, Negative Acknowledgement (NACK) message may be transmitted. It needs to be noted again that although three signals are shown, the solution may be applicable to two or more signals. Naturally, only one signal may be formed. However, this may not bring the same benefits as using two or more signals due to the absence of repetition of the second part.

The control message comprised in the second data block 304 may be related to channel estimation, phase noise and frequency offset estimation, and/or data receiving acknowledgement (i.e. ACK/NACK), for example. However, these are only examples, and thus the control message may comprise and/or be related to virtually any control message that may be transmitted from the apparatus to another apparatus using a signal. For example, let us consider a case where the network element 102 wants to provide a configuration control message towards a terminal device and uses this approach to convey the information. In one example, paging information or system information is transmitted by the network element 102 to the terminal device. Also, for the uplink direction, the terminal device may transmit, for example, buffer status reports and/or advanced scheduling requests to the network element 102. In an embodiment, the second parts of the multicarrier signals 352, 354, 356 are used as a low rate communication channel. Again it is reminded that two or more signals may be used. For example the second part of a FT DFT-s-OFDM signal may be used to map the ACK/NACK feedback for a Hybrid Automatic Repeat reRequest (HARQ) process. The same ACK/NACK message may be mapped over a set of time symbols, e.g. over an entire radio frame and/or a sub-frame. The set of time symbols may mean that each time symbol is represented by a FT DFT-s-OFDM signal. Using such approach may correspond to a repetition coding of the control message (e.g. ACK/NACK) which may allow obtaining combining gain at the receiver.

Repeating the control message for duration of two or more time symbols may also be beneficial in that the receiver may more reliably receive the transmitted control message. For example, if the control message would only be sent once, the receiving may be more unreliable compared to a situation where the control message is transmitted two or more times.

In an embodiment, the control message is divided between at least two multicarrier signals. For example, the first part of the first multicarrier signal 352 may comprise a first part of the control message, whereas the first part of the second multicarrier signal 354 may comprise a second part of the control message. The second parts of the first and second multicarrier signals 352, 354 may comprise a third part of the control message. As said the second parts may comprise the same data and/or be substantially identical.

Figure 4A:
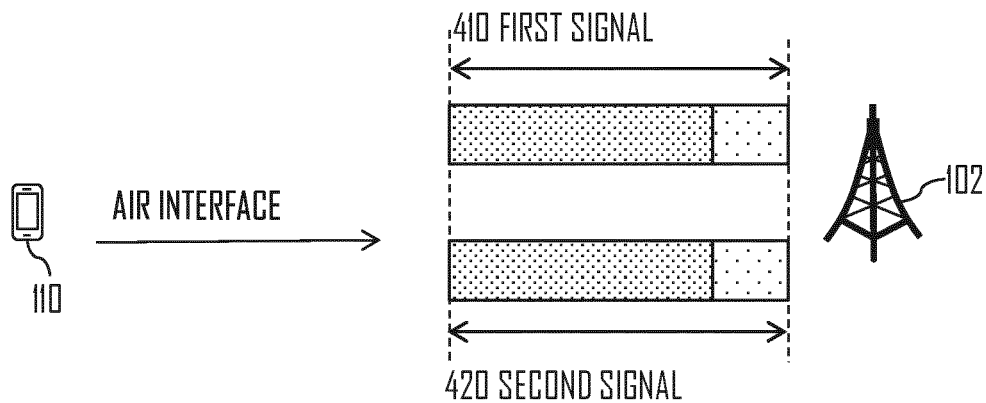
FIGS. 4A to 4B illustrate some embodiments.
Figure 4B:
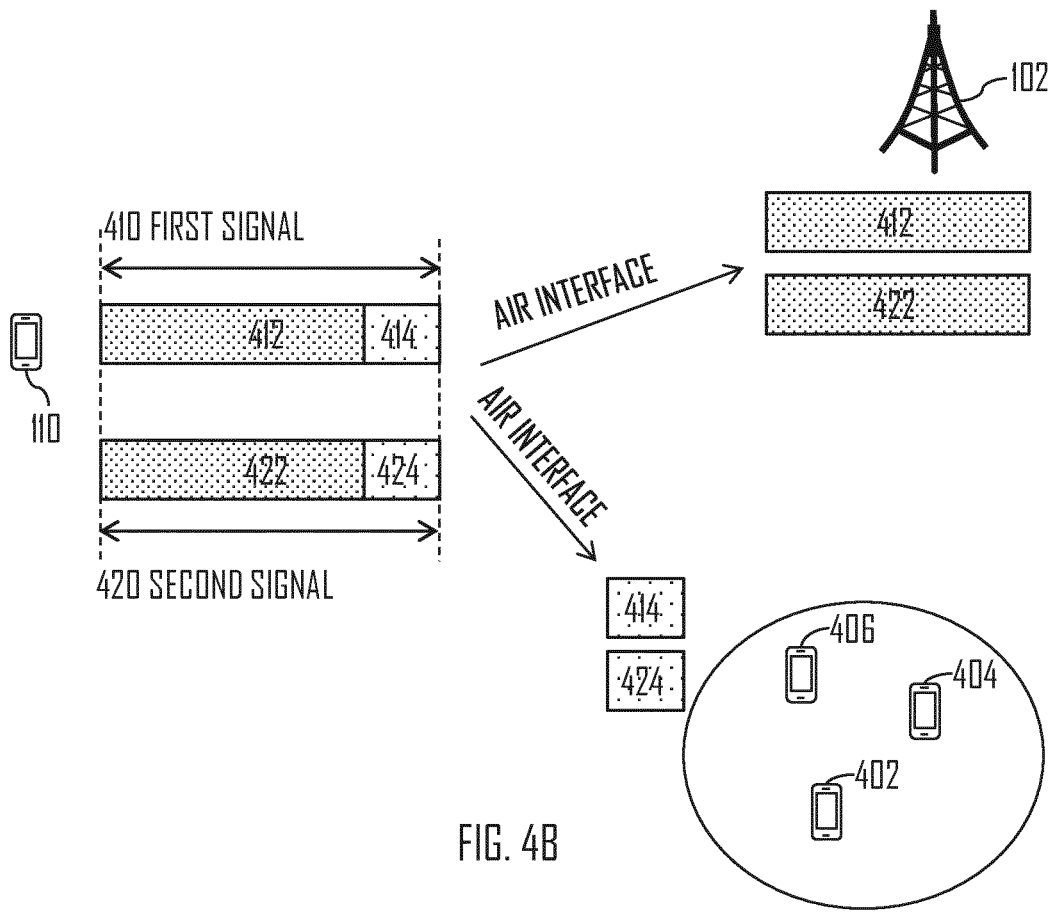

FIGS. 4A to 4B illustrate some embodiments. Although in FIGS. 4A to 4B the first terminal device 110, or some other terminal device, is shown to be transmitting the described multicarrier signals, it may be equally possible that the multicarrier signals are transmitted by the network element 102. Thus, it may be possible to use the described solution for uplink and/or downlink direction. In an embodiment, the apparatus performing the generation of the signals 410 and/or transmission of the signals comprises the first terminal device 110, a part of the terminal device 110 (i.e. communication circuitry), the network element 102, and/or a part of the network element 102. The first terminal device 110 and/or the network element 102 may be comprised in a cellular network, such as the radio communication system described above.

Referring to FIG. 4A, the first terminal device 110 may transmit a first multicarrier signal 410 and a second multicarrier signal 420 to the network element 102. The first and second signals 410, 420 may be similar and/or the same multicarrier signals as described in relation to FIGS. 1 to 3C, for example.

In the example of FIG. 4A, the first terminal device 110 may transmit the first and second multicarrier signals 410, 420 simultaneously to the network element 102. This may be achieved, for example, if the transmitted and the receiver are MIMO capable. In an embodiment, the first and second multicarrier signals 410, 420 are transmitted substantially simultaneously in time domain.

In an embodiment, the first and second multicarrier signals 410, 420 are transmitted using DC. For example, the network element 102 generates the signals 410, 420 and transmits the first signal 410 to the first terminal device 110, and causes another network element to transmit the second signal to the first terminal device 110. The signals may be transmitted between the network elements using, for example, air interface and/or X2-interface. Naturally, it may be possible that only the data is transmitted between the network elements, and thus the signal generation is performed by the transmitting network element. The DC transmission may be coordinated, by the network element, so that the first and second multicarrier signals 410, 420 are received substantially simultaneously by the first terminal device 110. This may require, for example, changing Timing Advance (TA) value of the transmitting network element.

Referring to FIG. 4B, the transmitting of the first and second multicarrier signals 410, 420, by for example the first terminal device 110 or the network element 102, may comprise broadcasting the second part 414 of the first multicarrier signal 410 and/or the second part 424 of the second multicarrier signal 420. For example, the first terminal device 110 may broadcast the second part(s) 414, 424 to a group of terminal devices 402, 404, 406. This may be enabled by the D2D communication, for example. In an embodiment, the network element 102 broadcasts the second part(s) 414, 424 to the group of terminal devices 402, 404, 406. The group may normally comprise more than two or more terminal devices, but in special cases the group may comprise only one terminal device. In such case, the transmitting may be broadcasting if it is not directed to a single receiver. That is, the transmitting may not be unicasting.

Still referring to FIG. 4B, the first terminal device 110 may transmit the first part(s) 412, 414 to the network element 102. This may be performed together with the broadcasting of the second part(s) 414, 424. It needs to be further noted that although in FIG. 4B the first and second multicarrier signals are shown to be substantially simultaneous in time domain, it may be equally possible that they are transmitted and/or broadcasted one after the other (e.g. they are adjacent in time domain).

Figure 5A:
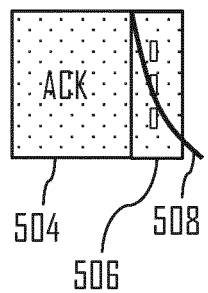
FIGS. 5A to 5B illustrate some embodiments.
Figure 5B:
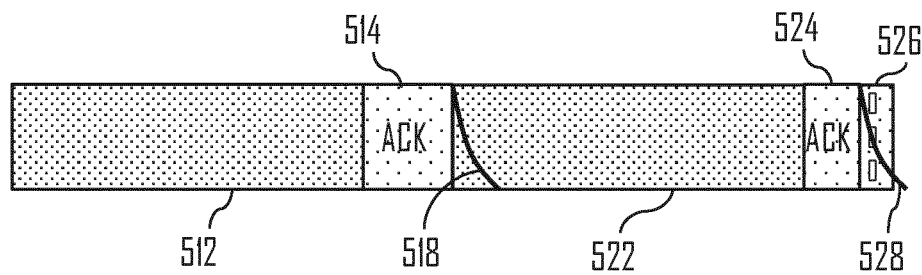

FIGS. 5A to 5B illustrate some embodiments. FIGS. 5A to 5B may illustrate embodiments that are usable in relation to the multicarrier signals introduced in relation to FIGS. 1 to 4B, for example. It needs to be noted that an update of the control message, such as a low rate communication channel message described above, may generate a non-cyclical ISI on a first symbol, or a first multicarrier signal, to which the new control message may be mapped. For example, if a first control message is transmitted over a first radio frame, and a second control message is transmitted over a second radio frame, meaning that multicarrier signals transmitted during the first radio frame may comprise the first control message, and multicarrier signals transmitted during the second radio frame may comprise the second control message, the transition between the two frames may cause the non-cyclical ISI on the first multicarrier signal of the second radio frame. To enhance delay spread control between changing second parts, the second part of the multicarrier signal may need to be manipulated.

Referring to FIG. 5A, a fixed part (also called as a second part) 504, 506 of a multicarrier signal may be shown. The fixed part 504, 506 may be similar or the same as the second part 344 shown in FIG. 3C, for example. As shown the fixed part 502, 504 of the multicarrier signal may be generated so that the fixed part 502, 504 comprises a first and second parts 502, 504, wherein the second part 504 comprises substantially zero values. This may allow to containing the energy components due the multipath propagation in the symbol itself, and thus reducing the impact of the energy spillover over the next symbol (or next multicarrier signal). In a way it may be understood that the length of the fixed part and/or the tail of the multicarrier signal is reduced by setting zero values at an end portion of the fixed part and/or the tail. As shown, a delay spread 508 may still be caused, but it may extend less over the next signal.

In an embodiment, a second data block, such as the second data block 304, comprises a data part and a zero part, the zero part comprising at least one substantially zero value. For example, that the second parts of the first and second multicarrier signals 352, 354 may be generated so that the zero part is subsequent in time domain compared with the data part. The effect of this may be shown in FIG. 5A, as also described above.

Referring to FIG. 5B, at least two multicarrier signals, such as the first and second multicarrier signals 352, 354, may be shown. A second part 514 of the first multicarrier signal 352 may be generated from the data of the second data block 304, wherein a second part 524, 526 of the second multicarrier signal 354 may be generated from at least one value of the second data block 304 and from at least one substantially zero value so that the at least one substantially zero value is subsequent in time domain compared with the at least one value of the second data block 304. Thus, as shown in FIG. 5B, the second part 524, 526 of the second multicarrier signal 354 may comprise the value part 524 and the zero part 526.

Using this approach the interference to a consecutive signal, comprising a changed control message, may be reduced. This is due to that a second delay spread 528 may extend less over the next multicarrier signal compared to a first delay spread 518 extending over the second multicarrier signal. However, the second part 524, 526 of the second multicarrier signal 354 may comprise at least most of the information comprised in the second part 514 of the first multicarrier signal 352. In an embodiment, the second part 524, 526 of the second multicarrier signal 354 and the second part 514 of the first multicarrier signal 352 differ from each other due to the introducing of the zero part 526, wherein the zero part 526 may limit the data transmitted in the second part 524, 526 of the second multicarrier signal 354.

Still referring to FIG. 5B, it needs to be noted that the first parts 512, 522 of the multicarrier signals 352, 354 may comprise different data and/or may be generated from different data. As explained, the first part of the first multicarrier signal 352 may be generated based on one data block, whereas the first part of the second multicarrier signal 354 may be generated based on another data block.

Figure 6:
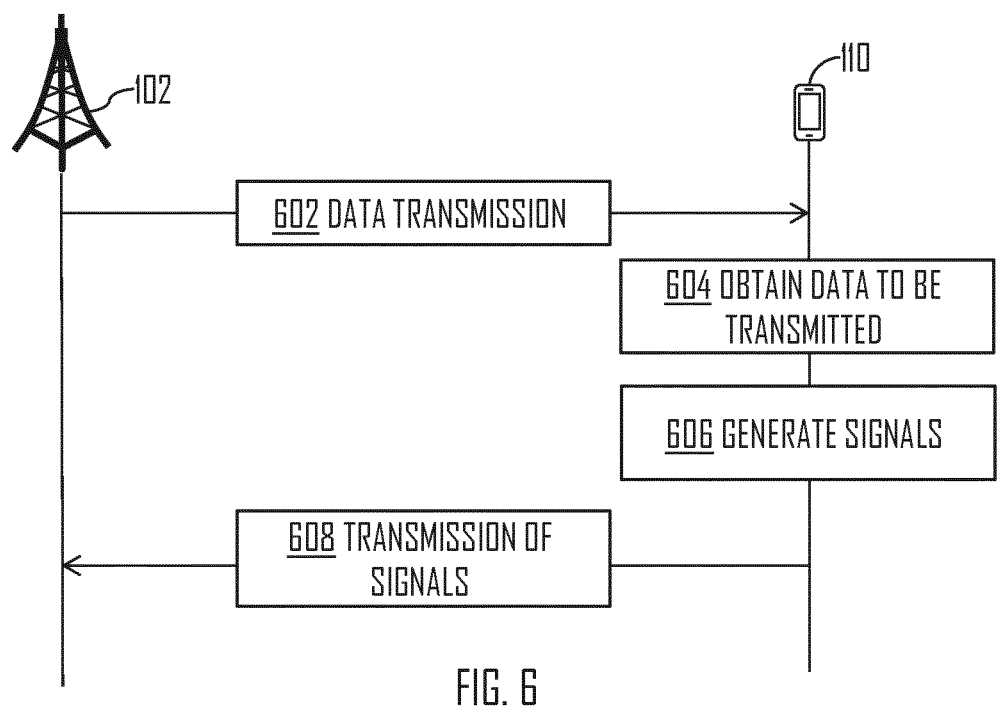
FIG. 6 illustrates a flow diagram according to an embodiment.

FIG. 6 illustrates a flow diagram according to an embodiment of the invention. Referring to FIG. 6, the network element 102 may transmit data to the first terminal device 110 (block 602). The data may be any downlink data that is normally transmitted between the network and the user device, such as voice call data, SMS data, or mobile data, to name a few examples. It may also comprise configuration information, for example. The first terminal device 110 may receive the downlink data.

In block 604, the first terminal device 110 may obtain and/or generate data that is to be transmitted to uplink direction (i.e. to the network element 102). The data may comprise, for example, first, second and third data blocks described in relation to FIG. 2. In block 606, the first terminal device 110 may continue on generating at least two multicarrier signals based on the data to be transmitted. For example, if there are two data blocks (i.e. first and third data blocks), the first terminal device 110 may generate two multicarrier signals.

The second data block obtained may comprise, for example, ACK and/or NACK message related to the data receiving in block 602. That is, the first terminal device 110 may, for example, generate the data of the second data block based on the receiving of the data transmission (block 602).

In block 608, the first terminal device 110 may transmit the at least two multicarrier signals to the network element 102. For example, if there are two multicarrier signals to be transmitted, wherein the signals comprise the first and third data blocks, the second parts (i.e. fixed parts or fixed tails)

of the signals may be generated so that they comprise the ACK/NACK message to the data transmission of block 602. Using such approach may help to handle the ISI, but may also save radio resources, as the ACK/NACK message may not need to be transmitted using a separate signal, and thus, time symbols may be saved.

Figure 7:
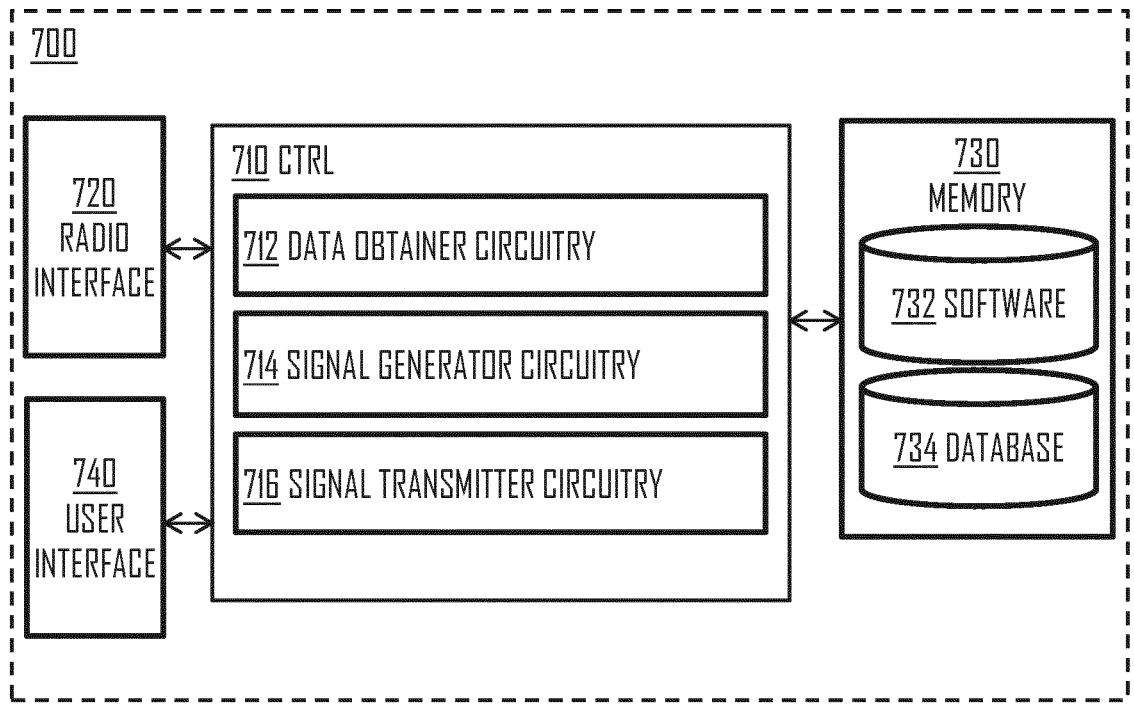
FIG. 7 illustrates an apparatus according to an embodiment of the invention.

FIG. 7 provide apparatus 700 comprising a control circuitry (CTRL) 710, such as at least one processor, and at least one memory 730 including a computer program code (software) 732, wherein the at least one memory and the computer program code (software) 732, are configured, with the at least one processor, to cause the respective apparatus 700 to carry out any one of the embodiments of FIGS. 1 to 6, or operations thereof.

In an embodiment, these operations may comprise tasks, such as, obtaining, by an apparatus, a first data block, a second data block and a third data block; generating a first multicarrier signal, wherein a first part of the first multicarrier signal is generated based on a data of the first data block, and wherein a second part of the first multicarrier signal is generated based on a data of the second data block, the second part of the first multicarrier signal being subsequent in time domain compared with the first part of the first multicarrier signal; generating a second multicarrier signal, wherein a first part of the second multicarrier signal is generated based on a data of the third data block, and wherein a second part of the second multicarrier signal is generated based on the data of the second data block, the second part of the second multicarrier signal being subsequent in time domain compared with the first part of the second multicarrier signal; and transmitting the first and second multicarrier signals.

Referring to FIG. 7, the memory 730 may be implemented using any suitable data storage technology, such as semiconductor based memory devices, flash memory, magnetic memory devices and systems, optical memory devices and systems, fixed memory and removable memory. The memory 730 may comprise a database 734 for storing data.

The apparatus 700 may further comprise radio interface (TRX) 720 comprising hardware and/or software for realizing communication connectivity according to one or more communication protocols. The TRX may provide the apparatus with communication capabilities to access the radio access network and enable communication between network nodes, for example. In the case the apparatus 700 is the network element 102, the TRX may provide the apparatus 700 connection to the above-mentioned X2 interface. The TRX may comprise standard well-known components such as an amplifier, filter, frequency-converter, (de)modulator, and encoder/decoder circuitries and one or more antennas.

The apparatus 700 may also comprise user interface 740 comprising, for example, at least one keypad, a microphone, a touch display, a display, a speaker, etc. The user interface 740 may be used to control the respective apparatus by a user of the apparatus 700.

In an embodiment, the apparatus 700 may be or be comprised in a base station (also called a base transceiver station, a Node B, a radio network controller, or an evolved Node B, for example). In an embodiment, the apparatus 700 is or is comprised in the network element 102.

In an embodiment, the apparatus 700 may be or be comprised in a terminal device, such as the first terminal device 110 or similar.

The control circuitry 710 may comprise a data obtainer circuitry 712 configured to obtaining a first data block, a second data block and a third data block. The control circuitry 710 may further comprise a signal generator circuitry 714. The signal generator circuitry 714 may be configured to generate a first multicarrier signal, wherein a first part of the first multicarrier signal is generated based on a data of the first data block, and wherein a second part of the first multicarrier signal is generated based on a data of the second data block, the second part of the first multicarrier signal being subsequent in time domain compared with the first part of the first multicarrier signal. The signal generator circuitry 714 may be further configured to generate a second multicarrier signal, wherein a first part of the second multicarrier signal is generated based on a data of the third data block, and wherein a second part of the second multicarrier signal is generated based on the data of the second data block, the second part of the second multicarrier signal being subsequent in time domain compared with the first part of the second multicarrier signal. Further, the control circuitry 710 may comprise a signal transmitter circuitry 716 configured to transmit the first and second multicarrier signals. For example, the first terminal device 110 may transmit the first and second multicarrier signals to the network element 102.

Figure 8:
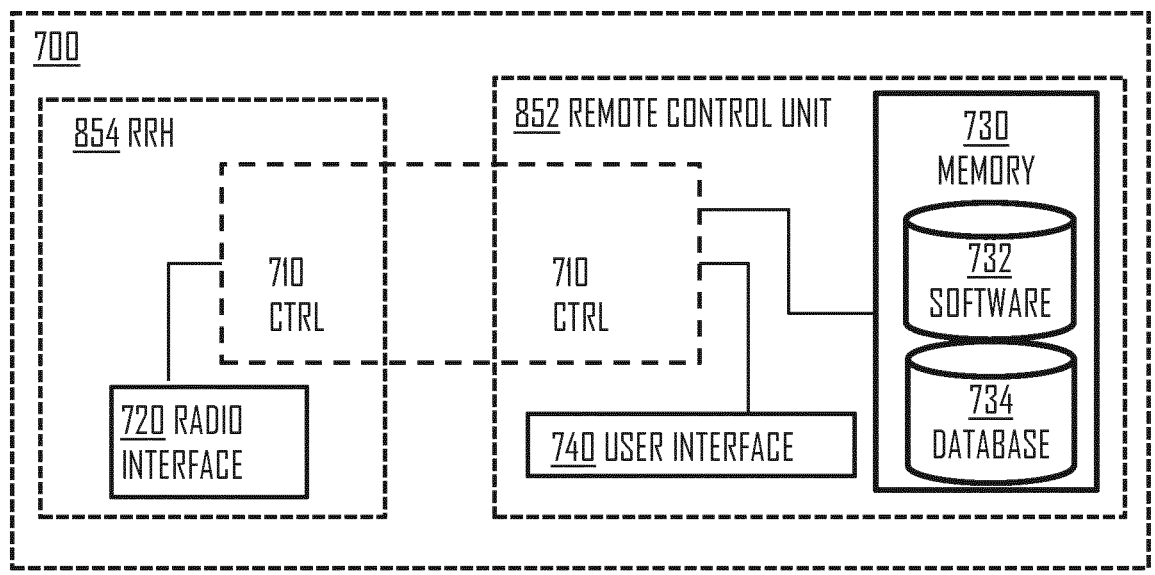
FIG. 8 illustrates an embodiment of the invention.

In an embodiment, as shown in FIG. 8, at least some of the functionalities of the apparatus 700 may be shared between two physically separate devices, forming one operational entity. Therefore, the apparatus 700 may be seen to depict the operational entity comprising one or more physically separate devices for executing at least some of the described processes. Thus, the apparatus 700 of FIG. 7, utilizing such shared architecture, may comprise a remote control unit (RCU) 852, such as a host computer or a server computer, operatively coupled (e.g. via a wireless or wired network) to a remote radio head (RRH) 854 located in the base station. In an embodiment, at least some of the described processes may be performed by the RCU 852. In an embodiment, the execution of at least some of the described processes may be shared among the RRH 854 and the RCU 852.

In an embodiment, the RCU 852 may generate a virtual network through which the RCU 852 communicates with the RRH 854. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system. Virtual networking may also be used for testing the at least one terminal device 110, 120.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 1 to 6 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 1 to 6 or operations thereof. In an embodiment, these operations may comprise tasks, such as, obtaining, by an apparatus, a first data block, a second data block and a third data block; generating a first multicarrier signal, wherein a first part of the first multicarrier signal is generated based on a data of the first data block, and wherein a second part of the first multicarrier signal is generated based on a data of the second data block, the second part of the first multicarrier signal being subsequent in time domain compared with the first part of the first multicarrier signal; generating a second multicarrier signal, wherein a first part of the second multicarrier signal is generated based on a data of the third data block, and wherein a second part of the second multicarrier signal is generated based on the data of the second data block, the second part of the second multicarrier signal being subsequent in time domain compared with the first part of the second multicarrier signal; and transmitting the first and second multicarrier signals.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 1 to 6, or operations thereof. In an embodiment, these operations may comprise tasks, such as, obtaining, by an apparatus, a first data block, a second data block and a third data block; generating a first multicarrier signal, wherein a first part of the first multicarrier signal is generated based on a data of the first data block, and wherein a second part of the first multicarrier signal is generated based on a data of the second data block, the second part of the first multicarrier signal being subsequent in time domain compared with the first part of the first multicarrier signal; generating a second multicarrier signal, wherein a first part of the second multicarrier signal is generated based on a data of the third data block, and wherein a second part of the second multicarrier signal is generated based on the data of the second data block, the second part of the second multicarrier signal being subsequent in time domain compared with the first part of the second multicarrier signal; and transmitting the first and second multicarrier signals.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 1 to 6 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:
1. A method comprising:
 obtaining, by an apparatus, a first data block, a second data block and a third data block;
 generating a first signal, wherein a first part of the first signal is generated based on a data of the first data block, and wherein a second part of the first signal is generated based on a data of the second data block, the second part of the first signal being subsequent in time domain compared with the first part of the first signal;

generating a second signal, wherein a first part of the second signal is generated based on a data of the third data block, wherein a second part of the second signal is generated based on the data of the second data block, the second part of the second signal being subsequent in time domain compared with the first part of the second signal, and wherein the second parts of the first and second signals are generated from the data of the second data block and are fixed-tail signals of said first and second signals, wherein the second data block comprises a data part and a zero part, the zero part comprising at least one substantially zero value and wherein the second parts of the first and second signals are generated so that the zero part is subsequent in time domain compared with the data part, the second parts of the first and second signals comprising the same data and wherein the second parts are repeated for a duration of a subframe; and transmitting the first and second signals.

2. The method of claim 1, wherein the second data block comprises a control message.

3. The method of claim 1, wherein the first and second signals are fixed-tail Discrete Fourier Transform-spread Orthogonal Frequency Division Multiplexing signals.

4. The method of claim 1, wherein the second part of the first signal is generated from the data of the second data block, wherein the second part of the second signal is generated from at least one value of the second data block and from at least one substantially zero value so that the at least one substantially zero value is subsequent in time domain compared with the at least one value of the second data block.

5. The method of claim 1, wherein the first and second signals are transmitted consecutively in time domain.

6. The method of claim 1, wherein the first and second signals are transmitted substantially simultaneously in time domain.

7. An apparatus comprising:
at least one processor; and
at least one memory including a computer program code, wherein the at least one memory and the computer program code are configured, with the at least one processor, to cause the apparatus to perform operations comprising:
obtaining a first data block, a second data block and a third data block;
generating a first signal, wherein a first part of the first signal is generated based on a data of the first data block, and wherein a second part of the first signal is generated based on a data of the second data block, the second part of the first signal being subsequent in time domain compared with the first part of the first signal;
generating a second signal, wherein a first part of the second signal is generated based on a data of the third data block, wherein a second part of the second signal is generated based on the data of the second data block, the second part of the second signal being subsequent in time domain compared with the first part of the second signal, and wherein the second parts of the first and second signals are generated from the data of the second data block and are fixed-tail signals of said first and second signals, wherein the second data block comprises a data part and a zero part, the zero part comprising at least one substantially zero value and wherein the second parts of the first and second signals are generated so that the zero part is subsequent in time domain compared with the data part, the second parts of the first and second signals comprising the same data and wherein the second parts are repeated for a duration of a subframe; and causing transmission of the first and second signals.

8. The apparatus of claim 7, wherein the second data block comprises a control message.

9. The apparatus of claim 8, wherein the control message is related to at least one of channel estimation, phase noise and frequency offset estimation, data receiving acknowledgement, paging information, system information, buffer status report, advanced scheduling request.

10. The apparatus of claim 7, wherein the first and second signals are fixed-tail Discrete Fourier Transform-spread Orthogonal Frequency Division Multiplexing signals.

11. The apparatus of claim 7, wherein the second part of the first signal is generated from the data of the second data block, wherein the second part of the second signal is generated from at least one value of the second data block and from at least one substantially zero value so that the at least one substantially zero value is subsequent in time domain compared with the at least one value of the second data block.

12. The apparatus of claim 7, wherein the first and second signals are transmitted consecutively in time domain.

13. The apparatus of claim 7, wherein the first and second signals are transmitted substantially simultaneously in time domain.

14. A computer program product comprising a non-transitory computer-readable storage medium bearing computer program code embodied therein for use with a computer, the computer program code comprising code for performing:
obtaining, by an apparatus, a first data block, a second data block and a third data block;
generating a first signal, wherein a first part of the first signal is generated based on a data of the first data block, and wherein a second part of the first signal is generated based on a data of the second data block, the second part of the first signal being subsequent in time domain compared with the first part of the first signal;
generating a second signal, wherein a first part of the second signal is generated based on a data of the third data block, wherein a second part of the second signal is generated based on the data of the second data block, the second part of the second signal being subsequent in time domain compared with the first part of the second signal, and wherein the second parts of the first and second signals are generated from the data of the second data block and are fixed-tail signals of said first and second signals, wherein the second data block comprises a data part and a zero part, the zero part comprising at least one substantially zero value and wherein the second parts of the first and second signals are generated so that the zero part is subsequent in time domain compared with the data part, the second parts of the first and second signals comprising the same data and wherein the second parts are repeated for a duration of a subframe; and transmitting the first and second signals.

* * * * *